United States Patent
Hatta et al.

(10) Patent No.: US 7,608,359 B2
(45) Date of Patent: Oct. 27, 2009

(54) BATTERY

(75) Inventors: Kazuhito Hatta, Fukushima (JP);
Takahiro Endo, Kanagawa (JP);
Tsuyonobu Hatazawa, Tokyo (JP);
Yuzuru Fukushima, Miyagi (JP)

(73) Assignee: Sony Corporation, Tokyo (JP)

( * ) Notice: Subject to any disclaimer, the term of this patent is extended or adjusted under 35 U.S.C. 154(b) by 704 days.

(21) Appl. No.: 10/796,240

(22) Filed: Mar. 9, 2004

(65) Prior Publication Data
US 2004/0229120 A1 Nov. 18, 2004

(30) Foreign Application Priority Data
Mar. 17, 2003 (JP) .................. P2003-072445

(51) Int. Cl.
*H01M 2/02* (2006.01)
*H01M 4/48* (2006.01)

(52) U.S. Cl. .................. 429/176; 429/231.1; 429/231.8

(58) Field of Classification Search ........................ None
See application file for complete search history.

(56) References Cited

U.S. PATENT DOCUMENTS 5,631,103 A * 5/1997 Eschbach et al. ............ 429/303
6,001,505 A * 12/1999 Fukuda et al. .............. 429/176
7,041,380 B2 * 5/2006 Yamashita et al. .......... 428/516
2001/0038941 A1 * 11/2001 Sunano ........................ 429/66

FOREIGN PATENT DOCUMENTS

| JP | 05-046969 | 2/1993 |
|---|---|---|
| JP | 10-302756 | 11/1998 |
| JP | 2000-090975 | 3/2000 |
| JP | 2000-215877 | 8/2000 |
| JP | 2001-148496 | 5/2001 |
| JP | 2001-176466 | 6/2001 |
| JP | 2002-187233 | 7/2002 |
| JP | 2002-234111 | 8/2002 |
| JP | 2002-367576 | 12/2002 |

* cited by examiner

*Primary Examiner*—John S Maples
(74) *Attorney, Agent, or Firm*—Sonnenschein Nath & Rosenthal LLP

(57) ABSTRACT

Provided is a battery capable of preventing the entry of water even if a sealing width is reduced. A battery element comprising a cathode and an anode is accommodated in a film-shaped casing. The casing includes a metal layer, a resin layer disposed on a side of the metal layer closer to the battery element with an adhesive layer in between, and a resin layer disposed on a side of the metal layer opposite to the side where the resin layer is formed with an adhesive layer in between. The adhesive layer has a water vapor transmission rate of 800 g/m²·day or less for a thickness of 25 μm at 40° C. and 90% RH and a thickness of 10 μm or less. Thereby, even if the sealing width is reduced, the entry of water into the battery can be prevented.

9 Claims, 3 Drawing Sheets

BATTERY

RELATED APPLICATION DATA

The present application claims priority to Japanese Application(s) No(s). P2003-072445 filed Mar. 17, 2003, which application(s) is/are incorporated herein by reference to the extent permitted by law.

BACKGROUND OF THE INVENTION

1. Field of the Invention

The present invention relates to a battery comprising a battery element which includes a cathode, an anode and an electrolyte and is accommodated in a film-shaped casing.

2. Description of the Related Art

In recent years, the development of cordless and portable electronic devices such as notebook personal computers and cellular phones have been advanced, so low-profile, compact and lightweight electronic devices have been developed one after another. Moreover, recently diversification of electronic devices causes an increase in power consumption, so higher capacity of batteries as energy sources of the electronic devices, specifically higher capacity of secondary batteries has been in increasing demand.

Secondary batteries conventionally used include lead-acid batteries, nickel-cadmium batteries and the like, and as new secondary batteries, nickel-hydrogen batteries and lithium-ion batteries have been put to practical use. However, these secondary batteries use a liquid as an electrolyte, so a problem of liquid leaks from the batteries arises.

Therefore, in order to overcome the problem, a polymer lithium-ion secondary battery using a gel electrolyte formed through expanding a high molecular weight compound by using an electrolyte solution or holding an electrolyte solution in a high molecular weight compound has been developed. There is a polymer lithium-ion secondary battery in which a battery element is interposed in a laminate film used as a casing, and edge portions of the casing are bonded together by thermally fusion bonding to seal the battery element (for example, refer to Japanese Unexamined Patent Application Publication No. Hei 3-62447). According to the secondary battery, a further reduction in size, weight and profile can be achieved, and its energy density can be improved.

However, water easily enters into the laminate film, compared to a metal container (battery can), so in the battery, lithium-ion consumption or generation of a decomposed gas, hydrofluoric acid or the like by decomposition of water occurs, thereby a decline in the capacity of the battery is apt to increase.

In order to reduce the entry of water, it is effective to secure a certain depth (sealing width) of a thermally fusion bonded portion. For example, in a battery with as small a size as the battery can be mounted in a cellular phone, the sealing width is approximately 5 mm in general. However, under the condition, it is difficult to improve the energy density of the battery. Therefore, a contrivance such as folding the thermally fusion bonded portion has been achieved; however, it is difficult to apply the contrivance to a portion where a cathode terminal or an anode terminal is derived in the thermally fusion bonded portion

SUMMARY OF THE INVENTION

In view of the foregoing, it is an object of the invention to provide a battery capable of preventing the entry of water even if a sealing width is reduced.

A first battery according to the invention comprises a battery element including a cathode, an anode and an electrolyte and being accommodated in a film-shaped casing, wherein the casing includes a metal layer and a resin layer disposed on a side of the metal layer close to the battery element with an adhesive layer in between, and the adhesive layer has a water vapor transmission rate of 800 g/m$^2$·day for a thickness of 25 μm at 40° C. and 90% RH and a thickness of 10 μm or less.

A second battery according to the invention comprises a battery element including a cathode, an anode and an electrolyte and being accommodated in a film-shaped casing, wherein the casing includes a metal layer and a thermoplastic layer with a thickness of 50 μm or less disposed on a side of the metal layer closer to the battery element.

In the first and the second batteries according to the invention, even if a sealing width is reduced, the entry of water into the battery can be prevented.

Other and further objects, features and advantages of the invention will appear more fully from the following description.

DETAILED DESCRIPTION OF THE PREFERRED EMBODIMENTS

Preferred embodiments of the invention will be described in more detail below referring to the accompanying drawings.

First Embodiment

Figure 1:
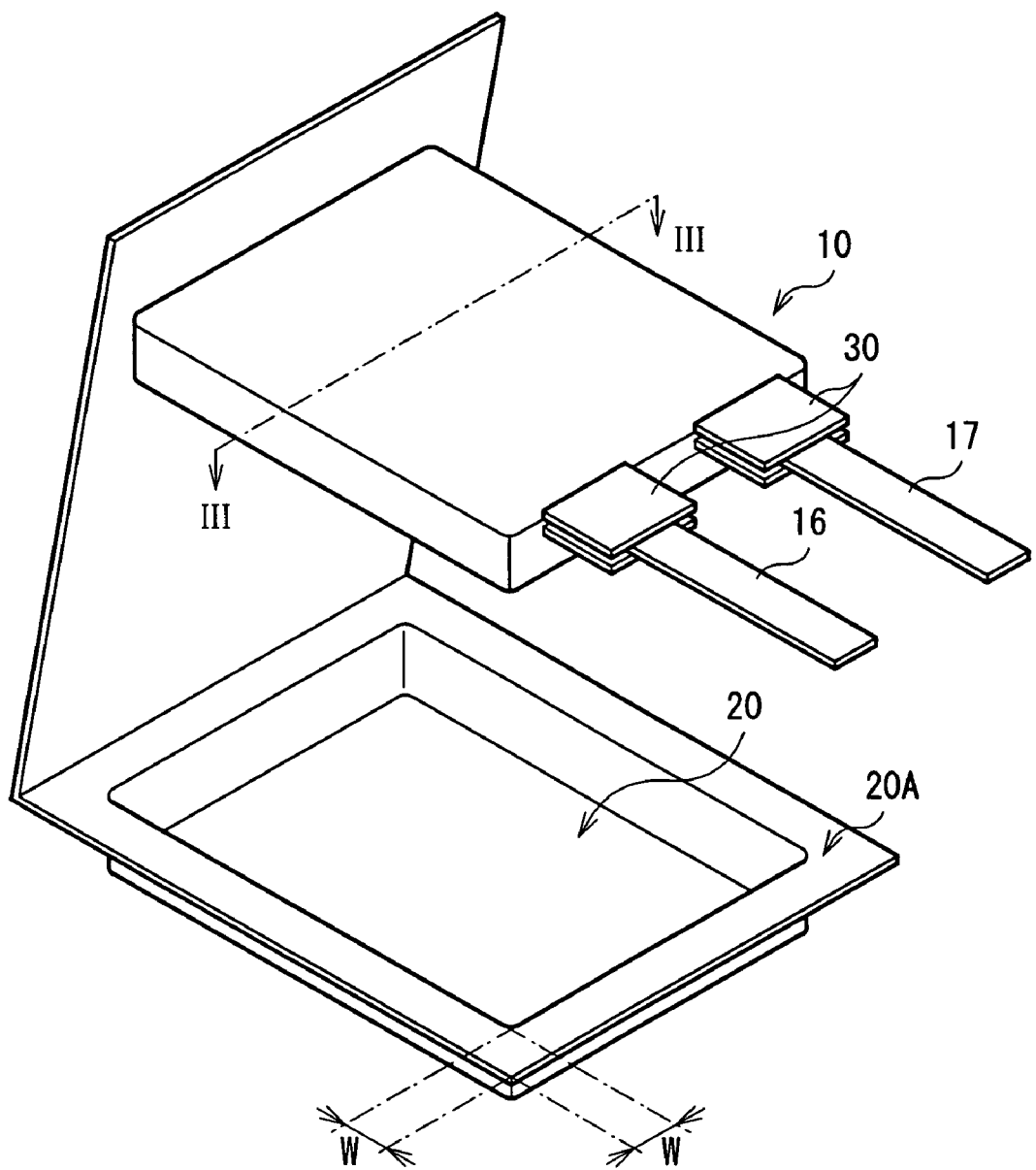
FIG. 1 is an exploded perspective view of a secondary battery according to a first embodiment of the invention.

FIG. 1 shows an exploded view of a secondary battery according to a first embodiment of the invention. The secondary battery comprises a battery element 10 accommodated in a film-shaped casing 20 which is folded into two. The casing 20 is sealed at a sealing portion 20A disposed in an edge portion of the casing 20. The sealing width W of the sealing portion 20A is preferably within a range of 1 mm to 5 mm inclusive, and more preferably 1 mm to less than 3 mm. When the sealing width W is too narrow, it is difficult to securely seal the casing 20, and when the sealing width W is too wide, the volume and the weight of the battery are increased, thereby the energy density of the battery declines.

Figure 2:
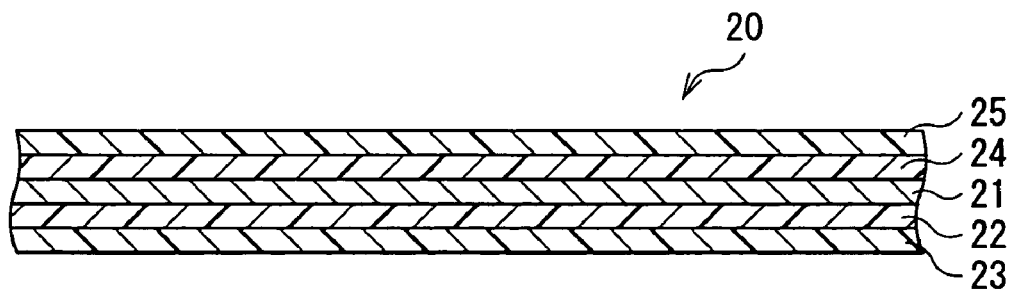
FIG. 2 is a sectional view of a casing shown in FIG. 1.

FIG. 2 shows a sectional view of the casing 20 shown in FIG. 1. The casing 20 is made of a laminate film including a metal layer 21, a resin layer 23 disposed on a side of the metal layer 21 closer to the battery element 10 with an adhesive layer 22 in between, and a resin layer 25 disposed on a side of the metal layer 21 opposite to the side where the resin layer 23 is disposed with an adhesive layer 24 in between. The metal layer 21 is made of, for example, aluminum.

The adhesive layer 22 is disposed to bond the metal layer 21 and the resin layer 23 together, and includes an adhesive. The adhesive means a material which is cured by evaporation of water or a solvent after the application of the material. As the adhesive, an acrylic adhesive is preferable, because the water vapor transmission rate thereof is low.

The adhesive layer 22 preferably has a water vapor transmission rate of 800 g/m$^2$·day or less for a thickness of 25 μm at 40° C. and 90% RH, and a thickness of 10 μm or less. The entry of water into the battery occurs mainly because water entered from an edge portion of the casing 20 is spread in the adhesive layer 22, and the amount of water entry depends upon a sectional area of the adhesive layer 22 exposed to air and the sealing width W, so when the water vapor transmission rate and the thickness are within the ranges, the entry of the water into the battery can be prevented. Moreover, the water vapor transmission rate for a thickness of 25 μm is more preferably 500 g/m²·day or less at 40° C. and 90% RH. Further, the thickness is more preferably 1 μm or over. It is because when the thickness is less than 1 μm, adhesion between the metal layer 21 and the resin layer 23 declines. The water vapor transmission rate is obtained by testing methods for determination of the water vapor transmission rate of moisture-proof packaging materials specified in JIS Z 0208.

The resin layer 23 bonds the edge portion of the casing 20 together to seal the casing 20, and includes, for example, a material with thermally fusion bonding properties. Examples of the material with thermally fusion bonding properties include polyolefin resins such as polyethylene, polypropylene, modified polyethylene and modified polypropylene. Among them, a modified polyolefin resin such as modified polyethylene or modified polypropylene is preferably used, because a resin piece 30 which will be described later becomes unnecessary. Moreover, an example of the modified polyethylene is modified polyethylene having a carbonyl group such as maleic anhydride modified polyethylene, and an example of the modified polypropylene is modified polypropylene having a carbonyl group such as maleic anhydride modified polypropylene. As the material with thermally fusion bonding properties, one kind or two or more kinds selected from them may be used. The resin layer 23 preferably has a thickness of 50 μm or less, and more preferably 3 μm or over. It is because when the thickness is larger than 50 μm, a large amount of water may be entered into the battery, and when the thickness is smaller than 3 μm, the thermally fusion bonding property declines.

The adhesive layer 24 bonds the metal layer 21 and the resin layer 25 together, and includes an adhesive as in the case of the adhesive layer 22. Examples of the adhesive of the adhesive layer 24 include acrylic adhesives, polyester adhesives and polyurethane adhesives, and one kind or a mixture of two or more kinds selected from them may be used.

Figure 3:
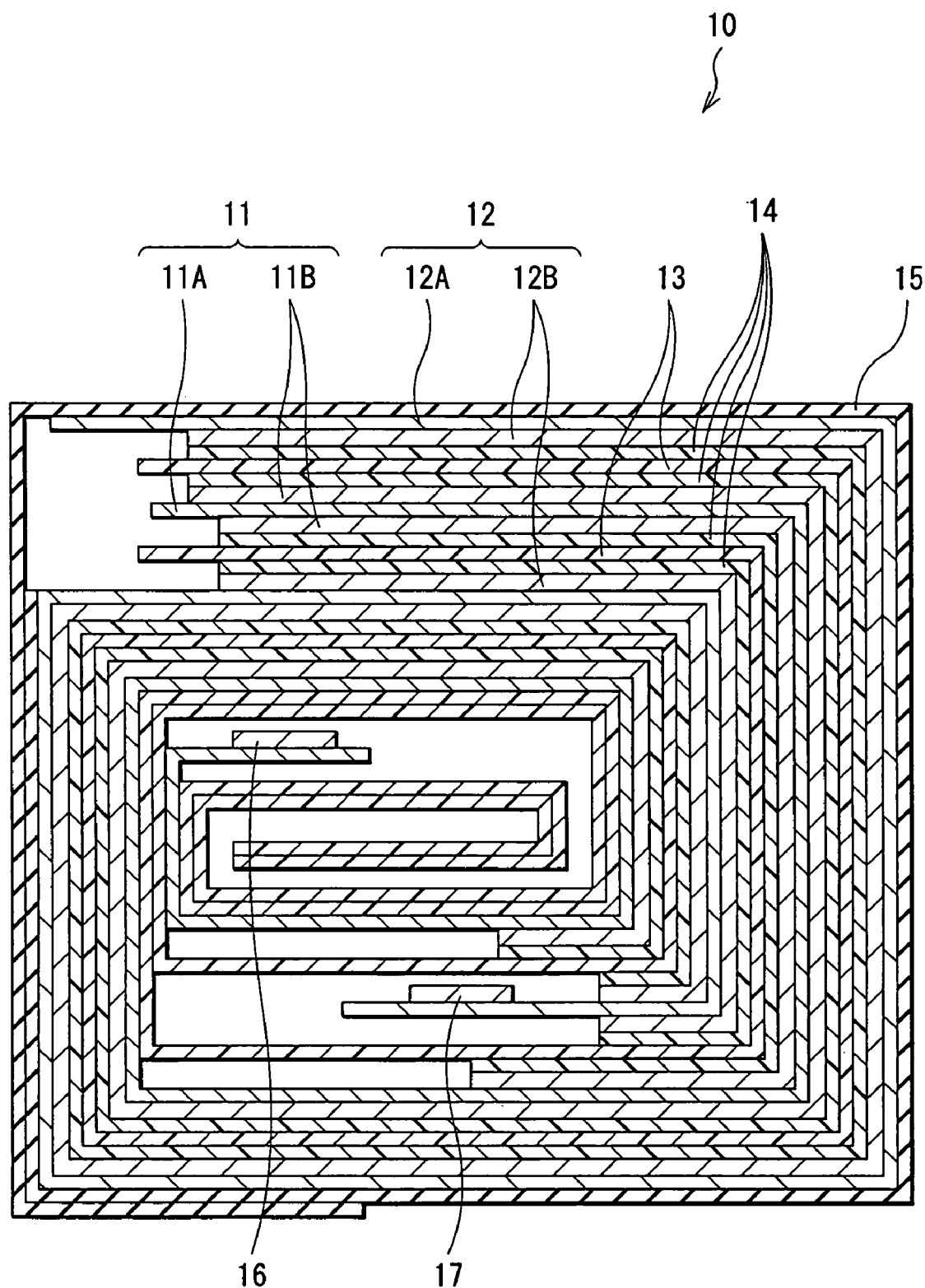
FIG. 3 is a sectional view of a battery element taken along a line III-III of FIG. 1.

FIG. 3 shows a sectional view of the battery element 10 taken along a line III-III of FIG. 1. The battery element 10 includes a spirally wound laminate which includes a cathode 11 and an anode 12 with a separator 13 and an electrolyte layer 14 in between, and an outermost portion of the battery element 10 is protected by a protective tape 15. A cathode terminal 16 made of, for example, aluminum is connected to the cathode 11, and an anode terminal 17 made of, for example, nickel is connected to the anode 12. The cathode terminal 16 and the anode terminal 17 are derived from the inside of the casing 20 to outside, for example, in the same direction (refer to FIG. 1).

The cathode 11 includes, for example, a cathode current collector 11A and a cathode mixture layer 11B disposed on either side or both sides of the cathode current collector 11A. The cathode current collector 11A is made of, for example, aluminum, nickel or stainless. The cathode mixture layer 11B includes a cathode material capable of inserting and extracting lithium as a cathode active material and, if necessary, an electronic conductor such as a carbon material, and a binder such as polyvinylidene fluoride.

As the cathode material capable of inserting and extracting lithium, for example, a metal oxide, a metal sulfide, a specific high molecular weight material or the like is preferable, and one kind or two or more kinds are selected from them, depending upon the use of the battery.

Examples of the metal oxide include a complex oxide of lithium and a transition metal represented by $Li_xMO_2$, and $V_2O_5$. Specifically the complex oxide is preferable, because the voltage and the energy density can be improved. In the above composition formula, M preferably includes one or more kinds of transition metals, more specifically at least one kind selected from the group consisting of cobalt (Co), nickel (Ni) and manganese (Mn). The value of x depends upon a charge-discharge state of the battery, and is generally within a range of $0.05 \leq x \leq 1.10$. Examples of the lithium complex oxide include $LiCoO_2$, $LiNiO_2$, $LiNi_yCo_{1-y}O_2$ ($0<y<1$ in the formula), $LiMn_2O_4$ having a spinel structure and the like.

Examples of the metal sulfide include $TiS_2$, $MoS_2$ and the like, and examples of the high molecular weight material include polyacetylene, polypyrrole and the like. Moreover, in addition to them, as the cathode material capable of inserting and extracting lithium, $NbSe_2$ or the like can be used.

As in the case of the cathode 11, the anode 12 includes, for example, an anode current collector 12A and an anode mixture layer 12B disposed on either side or both sides of the anode current collector 12A. The anode current collector 12A is made of, for example, copper, nickel or stainless.

For example, the anode mixture layer 12B includes one or more kinds of anode materials capable of inserting and extracting lithium as anode active materials, and may include a binder such as vinylidene fluoride if necessary.

Examples of the anode material capable of inserting and extracting lithium include a carbon material, a metal oxide and a high molecular weight material. Examples of the carbon material include kinds of pyrolytic carbon, kinds of coke, kinds of graphite, kinds of glass-like carbon, a sintered high molecular weight organic compound body, carbon fiber, spherical carbon, activated carbon and the like. Among them, kinds of coke include pitch coke, needle coke, petroleum coke and the like, and the sintered high molecular weight organic compound body is a high molecular weight material such as a phenolic resin or a furan resin which is carbonized through sintering at an adequate temperature. Moreover, examples of the metal oxide include iron oxide, ruthenium oxide, molybdenum oxide and the like, and examples of the high molecular weight material include polyacetylene, polypyrrole and the like.

Examples of the anode material capable of inserting and extracting lithium include metal elements and metalloid elements capable of forming an alloy with lithium, alloys thereof, and compounds thereof. Examples of the alloys include alloys including two or more kinds of metal elements as well as alloys including one or more kinds of metal elements and one or more kinds of metalloid elements. The composition thereof includes a solid solution, a eutectic (eutectic mixture), an intermetallic compound or the coexistence of two or more kinds selected from them.

Examples of the metal elements and metalloid elements capable of forming an alloy with lithium include magnesium (Mg), boron (B), arsenic (As), aluminum, gallium (Ga), indium (In), silicon (Si), germanium (Ge), tin (Sn), lead (Pb), antimony (Sb), bismuth (Bi), cadmium (Cd), silver (Ag), zinc (Zn), hafnium (Hf), zirconium (Zr), yttrium (Y), palladium (Pd) and platinum (Pt). Examples of the alloys and the compounds thereof include alloys and compounds represented by a chemical formula $Ma_sMb_tLi_u$ and a chemical formula $Ma_p$-$Mc_qMd_r$. In these chemical formulas, Ma represents at least one kind selected from metal elements and metalloid elements which can form an alloy with lithium, Mb represents at least one kind selected from metal elements and metalloid elements except for lithium and Ma, Mc represents at least one kind selected from nonmetal elements, and Md represents at least one kind selected from metal elements and metalloid elements except for Ma. Further, the values of s, t, u, p, q and r are $s>0$, $t \geqq 0$, $u \geqq 0$, $p>0$, $q>0$ and $r \geqq 0$, respectively.

Among them, a metal element or a metalloid element selected from Group 4B elements in the short form of the periodic table of the elements, or an alloy thereof or a compound thereof is preferable, and silicon or tin, or an alloy thereof or a compound thereof is more preferable. They may have a crystalline structure or an amorphous structure.

Examples of such an alloy or such a compound include LiAl, AlSb, CuMgSb, $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v\leqq 2$), $SnO_w$ ($0<w\leqq 2$), $SnSiO_3$, LiSiO, LiSnO and the like.

The separator 13 separates the cathode 11 and the anode 12 to prevent a short circuit of current due to contact between them, as well as passes lithium ions therethrough. The separator 13 is made of, for example, a porous film of a synthetic resin such as polytetrafluoroethylene, polypropylene or polyethylene, or a porous film of an inorganic material such as a ceramic nonwoven fabric, and the separator 23 may have a structure in which two or more kinds of the porous films are laminated.

The electrolyte layer 14 includes a gel electrolyte or a solid electrolyte. The gel electrolyte is a high molecular weight compound holding an electrolyte solution in which a lithium salt as an electrolyte salt is dissolved in a solvent. Examples of the high molecular weight compound include an ether-based high molecular weight compound such as polyethylene oxide or a cross-link including polyethylene oxide, an ester-based high molecular weight compound such as polymethacrylate, an acrylate-based high molecular weight compound and a fluorine-based high molecular weight compound such as polyvinylidene fluoride, or a copolymer of vinylidene fluoride and hexafluoropropylene, and one kind or a mixture of two or more kinds selected from them is used. Specifically, in point of oxidation-reduction stability, the fluorine-based high molecular weight compound is preferably used.

As the high molecular weight compound, in addition to them, for example, polyacrylonitrile and a copolymer of polyacrylonitrile can be used, and examples of a vinyl monomer as a monomer of the copolymer include vinyl acetate, methyl methacrylate, butyl methacrylate, methyl acrylate, butyl acrylate, itaconic acid, hydrogenated methyl acrylate, hydrogenated ethyl acrylate, acrylamide, vinyl chloride, vinylidene fluoride, vinylidene chloride and the like. In addition, acrylonitrile butadiene rubber, an acrylonitrile butadiene styrene resin, an acrylonitrile-chlorinated polyethylene-propylene-diene-styrene resin, an acrylonitrile-chlorinated vinyl resin, an acrylonitrile methacrylate resin, or an acrylonitrile acrylate resin may be used.

Examples of the solvent include propylene carbonate, ethylene carbonate, diethyl carbonate, methyl ethyl carbonate, 1,2-dimethoxyethane, 1,2-diethoxyethane, γ-butyrolactone, tetrahydrofuran, 2-methyltetrahydrofuran, 1,3-dioxolane, 4-methyl-1,3-dioxolane, diethyl ether, sulfolane, methylsulfolane, acetonitrile, propylnitrile, anisole, acetate, propionate and the like, and one kind or a mixture of two or more kinds selected from them may be used.

Examples of the lithium salt include lithium chloride (LiCl), lithium bromide (LiBr), lithium iodide (LiI), lithium chlorate ($LiClO_3$), lithium perchlorate ($LiClO_4$), lithium bromate ($LiBrO_3$), lithium iodate ($LiIO_3$), lithium nitrate ($LiNO_3$), lithium tetrafluoroborate ($LiBF_4$), lithium hexafluorophosphate ($LiPF_6$), lithium acetate ($CH_3COOLi$), lithium bis(trifluoromethanesulfonyl)imide (($CF_3SO_2)_3NLi$), lithium bis(pentafluoroethanesulfonyl)imide (($C_2F_5SO_2)_3NLi$), lithium hexafluoroarsenate ($LiAsF_6$), lithium trifluoromethane sulfonate ($LiCF_3SO_3$), lithium tris(trifluoromethanesulfonyl)methyl ($LiC(SO_2CF_3)_3$), lithium tetrachloroaluminate ($LiAlCl_4$), lithium hexafluorosilicate ($LiSiF_6$), and one kind or a mixture of two or more kinds selected from them may be used. Among them, in terms of oxidation stability, $LiPF_6$ or $LiBF_4$ is preferably used.

The content of the lithium salt in the gel electrolyte is preferably within a range of 0.1 mol/l to 3.0 mol/l in the electrolyte solution, and more preferably 0.5 mol/l to 2.0 mol/l.

As the solid electrolyte, for example, a solid high molecular weight electrolyte in which an electrolyte salt is dispersed in a high molecular weight compound having ionic conductivity or an inorganic solid electrolyte made of ion-conductive glass or ionic crystal can be used. When the solid electrolyte is used, the separator 13 may not be included. Examples of the high molecular weight compound of the solid high molecular weight electrolyte include silicon gel, acrylic gel, acrylonitrile gel, a modified polyphosphazene polymer, polyethylene oxide, polypropylene oxide, or a complex polymer thereof, a cross-linked polymer thereof and a modified polymer thereof. Moreover, in addition to them, polyvinylidene fluoride, a copolymer of vinylidene fluoride and hexafluoropropylene, a copolymer of vinylidene fluoride and tetrafluoroethylene, a copolymer of vinylidene fluoride and trifluoroethylene or the like may be used.

In the secondary battery, as shown in FIG. 1, the resin piece 30 is inserted each between the casing 20 and the cathode terminal 16 of the battery element 10 and between the casing 20 and the anode terminal 17 of the battery element 10 to prevent the entry of outside air. The resin piece 30 prevents a short circuit due to burrs of the cathode terminal 16 and the anode terminal 17 or the like, and enhances adhesion between the cathode terminal 16 and the casing 20 and between the anode terminal 17 and the casing 20. The resin piece 30 is made of, for example, a polyolefin resin such as polyethylene, polypropylene, modified polyethylene or modified polypropylene.

The secondary battery with such a structure can be manufactured through the following steps, for example.

At first, the resin layer 25 is bonded to one side of the metal layer 21 with the adhesive layer 24 in between, and then the resin layer 23 is bonded to the other side of the metal layer 21 with the adhesive layer 22, thereby a rectangular-shaped casing 20 is formed.

Then, for example, a cathode active material, an electronic conductor and a binder are mixed, and a dispersion medium such as N-methyl-2-pyrrolidone is added to the mixture to produce cathode mixture slurry. After the cathode mixture slurry is applied to one side or both sides of the cathode current collector 11A, and is dried, the cathode mixture layer 11B is formed through compression molding so as to form the cathode 11.

Further, an anode active material and a binder are mixed, and a dispersion medium such as N-methyl-2-pyrrolidone is added to the mixture to produce anode mixture slurry. After the anode mixture slurry is applied to one side or both sides of the anode current collector 12A, and is dried, the anode mixture layer 12B is formed through compression molding so as to form the anode 12.

Next, for example, the electrolyte layer 14 is formed on each of the cathode 11 and the anode 12. After that, the cathode terminal 16 is attached to the cathode current collector 11A by welding, and the anode terminal 17 is attached to the anode current collector 12A by welding.

Then, after the cathode 11 having the electrolyte layer 14 thereon and the anode 12 having the electrolyte layer 14 thereon are laminated with the separator 13 in between, and the laminate is spirally wound, the protective tape 15 is bonded to an outermost portion of the spirally wound laminate so as to form the battery element 10.

Finally, for example, the casing 20 is folded into two, and the battery element 10 is interposed in the casing 20. Then, edge portions of the casing 20 are bonded together by thermally fusion bonding to seal the casing 20. At this time, the resin piece 30 is inserted each between the cathode terminal 16 and the casing 20 and between the anode terminal 17 and the casing 20. Thereby, the secondary battery shown in FIG. 1 is completed.

Thus, in the embodiment, the water vapor transmission rate of the adhesive layer 22 is 800 g/m$^2$·day or less for a thickness of 25 μm at 40° C. and 90% RH, and the thickness of the adhesive layer 22 is 10 μm or less, so even if the sealing width W is, for example, 5 mm or less, more specifically less than 3 mm, the entry of water into the battery can be prevented. Therefore, the energy density per unit volume can be improved, and decomposition of water can be prevented, thereby a decline in capacity and the generation of a decomposed gas due to lithium-ion consumption can be prevented.

Second Embodiment

Figure 4:
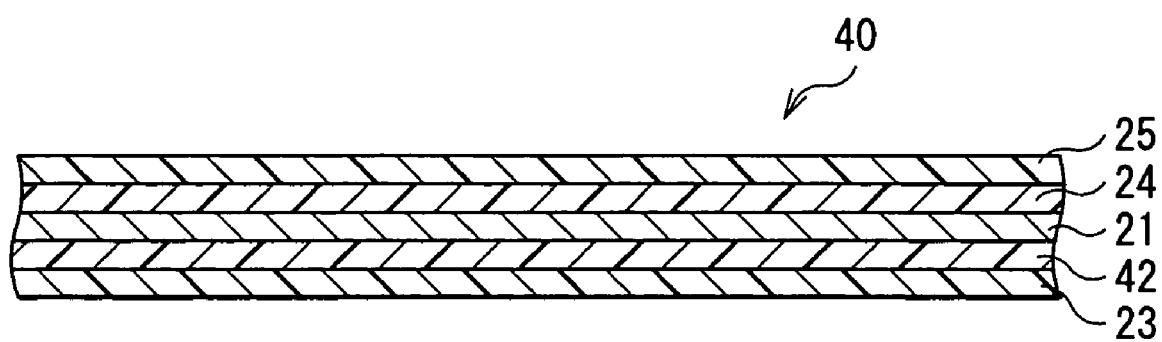
FIG. 4 is a sectional view of a casing according to a second embodiment of the invention.

FIG. 4 shows a sectional view of a casing of a secondary battery according to a second embodiment of the invention. The secondary battery according to the embodiment is equivalent to that according to the first embodiment, except that a casing 40 instead of the casing 20 is included. Therefore, like components are denoted by like numerals as of the first embodiment and will not be further described.

The casing 40 is equivalent to the casing 20, except that a thermoplastic layer 42 is included instead of the adhesive layer 22. The thermoplastic layer 42 bonds the metal layer 21 and the resin layer 23 together as in the case of the adhesive layer 22, and is made of a thermoplastic resin. As the thermoplastic resin, for example, a modified polyolefin resin is cited. As the modified polyolefin resin, modified polyethylene having a carbonyl group such as maleic anhydride modified polyethylene, and modified polypropylene having a carbonyl group such as maleic anhydride modified polypropylene are preferable. It is because the modified polyolefin having a carbonyl group is thermally fusion bonded to the metal layer 21 and the resin layers 23 and 25 through a heating process, thereby the modified polyolefin performs the same function as that of the adhesive layer 22. One kind or two or more kinds selected from the thermoplastic resins may be used. Further, the thermoplastic layer 42 may include a single layer or a plurality of layers.

The thickness of the thermoplastic layer 42 is preferably 50 μm or less, because the entry of water into the battery can be prevented. Moreover, the thickness is more preferably 3 μm or over, because when the thickness is smaller than 3 μm, adhesion between the metal layer 21 and the resin layer 23 declines.

The thermoplastic layer 42 may be formed with the resin layer 23 as a unit by co-extrusion, or may be formed through pouring a molten thermoplastic resin between the metal layer 21 and the resin layer 23 in the case where the metal layer 21 and the resin layer 23 are bonded together, and then cooling the resin.

In the embodiment, the resin layer 23 may not be included. In this case, the thermoplastic layer 42 performs the same function as that of the resin layer 23 which bonds edge portions of the casing 40 together so as to seal the casing 40.

Thus, in the embodiment, the thermoplastic layer 42 with a thickness of 50 μm or less is included, so the same effects as those in the first embodiment can be obtained.

EXAMPLES

Next, specific examples of the invention will be described in detail below.

Examples 1-1 Through 1-12

Secondary batteries described in the first embodiment were formed. First of all, the casing 20 with a size of 70 mm×70 mm for each of Examples 1-1 through 1-12 was formed through the following steps. At first, after nylon was bonded to one side of aluminum foil with a thickness of 40 μm with a polyurethane adhesive, an acrylic adhesive with a thickness of 1 μm was applied to the other side of the aluminum foil so as to bond a polypropylene film which is capable of being thermally fusion bonded and having a thickness of 30 μm to the aluminum foil. In other words, the casing 20 including the metal layer 21 made of aluminum, the resin layer 23 made of polypropylene which was disposed on the metal layer 21 with the adhesive layer 22 made of the acrylic adhesive in between and the resin layer 25 made of nylon which was disposed on a side of the metal layer 21 opposite to the side where the resin layer 23 was disposed with the adhesive layer 24 in between was formed. At that time, the water vapor transmission rate of the adhesive layer 22 for a thickness of 25 μm at 40° C. and 90% RH and the thickness of the adhesive layer 22 were changed in Examples 1-1 through 1-12 as shown in Table 1. After that, the casing 20 was formed through deep-drawing so as to have a projection portion on the resin layer 25 side of the casing 20, thereby the battery element 10 with a size of 34 mm×56 mm could be accommodated in the casing 20.

TABLE 1

| | ADHESIVE LAYER | | | | AMOUNT OF WATER | CAPACITY RETENTION | | |
|---|---|---|---|---|---|---|---|---|
| | MATERIAL | WATER VAPOR TRANSMISSION RATE (g/m$^2$·day) | THICKNESS (μm) | SEALING WIDTH (mm) | ENTRY AFTER STORAGE (μg) | RATIO AFTER STORAGE (%) | GAS GENERATION AFTER STORAGE | VOLUME ENERGY DENSITY (Wh/l) |
| EXAMPLE 1-1 | ACRYLIC ADHESIVE | 500 | 1 | 1 | 404 | 95 | NO | 350 |
| EXAMPLE 1-2 | ACRYLIC ADHESIVE | 400 | 1 | 1 | 323 | 96 | NO | 350 |
| EXAMPLE 1-3 | ACRYLIC ADHESIVE | 300 | 1 | 1 | 243 | 96 | NO | 350 |

TABLE 1-continued

| | ADHESIVE LAYER | | | SEALING WIDTH (mm) | AMOUNT OF WATER ENTRY AFTER STORAGE (μg) | CAPACITY RETENTION RATIO AFTER STORAGE (%) | GAS GENERATION AFTER STORAGE | VOLUME ENERGY DENSITY (Wh/l) |
|---|---|---|---|---|---|---|---|---|
| | MATERIAL | WATER VAPOR TRANSMISSION RATE (g/m² · day) | THICKNESS (μm) | | | | | |
| EXAMPLE 1-4 | ACRYLIC ADHESIVE | 800 | 1 | 2 | 323 | 96 | NO | 320 |
| EXAMPLE 1-5 | ACRYLIC ADHESIVE | 600 | 1 | 2 | 243 | 96 | NO | 320 |
| EXAMPLE 1-6 | ACRYLIC ADHESIVE | 500 | 1 | 2 | 202 | 96 | NO | 320 |
| EXAMPLE 1-7 | ACRYLIC ADHESIVE | 500 | 1 | 3 | 135 | 96 | NO | 294 |
| EXAMPLE 1-8 | ACRYLIC ADHESIVE | 500 | 1 | 5 | 81 | 97 | NO | 250 |
| EXAMPLE 1-9 | ACRYLIC ADHESIVE | 500 | 1 | 8 | 51 | 97 | NO | 201 |
| EXAMPLE 1-10 | ACRYLIC ADHESIVE | 300 | 3 | 5 | 146 | 97 | NO | 250 |
| EXAMPLE 1-11 | ACRYLIC ADHESIVE | 300 | 5 | 5 | 243 | 96 | NO | 250 |
| EXAMPLE 1-12 | ACRYLIC ADHESIVE | 300 | 10 | 5 | 485 | 95 | NO | 250 |
| COMPARATIVE EXAMPLE 1-1 | ACRYLIC ADHESIVE | 500 | 15 | 1 | 6064 | 40 | YES | 350 |
| COMPARATIVE EXAMPLE 1-2 | MIXED ACRYLIC ADHESIVE | 1000 | 1 | 1 | 809 | 63 | YES | 350 |
| COMPARATIVE EXAMPLE 1-3 | POLYURETHANE ADHESIVE | 3000 | 1 | 1 | 2426 | 61 | YES | 350 |
| COMPARATIVE EXAMPLE 1-4 | POLYESTER ADHESIVE | 5000 | 1 | 1 | 4043 | 69 | YES | 350 |
| COMPARATIVE EXAMPLE 1-5 | POLYESTER ADHESIVE | 5000 | 1 | 10 | 404 | 95 | NO | 176 |

Moreover, the cathode 11 was formed through the following steps. At first, lithium carbonate ($Li_2CO_3$) and cobalt carbonate ($CoCO_3$) were mixed at a molar ratio of 0.5:1, and the mixture was fired in air at 900° C. for 5 hours to obtain lithium cobalt oxide ($LiCoO_2$) as a cathode active material. Next, after 91 parts by weight of lithium cobalt oxide and 6 parts by weight of graphite as an electronic conductor and 10 parts by weight of vinylidene fluoride as a binder were mixed to prepare a cathode mixture, the cathode mixture was dispersed in N-methyl-2-pyrrolidone as a dispersion medium to produce cathode mixture slurry. After the cathode mixture slurry was uniformly applied to one side of the cathode current collector 11A made of strip-shaped aluminum foil with a thickness of 20 μm, and was dried, the cathode mixture layer 11B was formed through compression molding by a roller press. After that, a laminate including the cathode current collector 11A and the cathode mixture layer 11B was cut into a 50 mm×300 mm piece.

Moreover, the anode 12 was formed through the following steps. At first, after 90 parts by weight of graphite powder as a pulverized anode active material and 10 parts by weight of vinylidene fluoride as a binder were mixed to prepare an anode mixture, the cathode mixture was dispersed in N-methyl-2-pyrrolidone to produce anode mixture slurry. Next, after the anode mixture slurry was uniformly applied to one side of the anode current collector 12A made of strip-shaped copper foil with a thickness of 10 μm, and was dried, the anode mixture layer 12B was formed through compression molding by a roller press. After that, a laminate including the anode current collector 12A and the anode mixture layer 12B was cut into a 52 mm×320 mm piece.

After the cathode 11 and the anode 12 were formed, 10 parts by weight of a copolymer with a weight-average molecular weight of 600,000 including vinylidene fluoride and hexafluoropropylene and 60 parts by weight of diethyl carbonate were mixed and dissolved in 30 parts by weight of an electrolyte solution including 42.5 parts by weight of ethylene carbonate, 42.5 parts by weight of propylene carbonate and 15 parts by weight of $LiPF_6$ to form a sol electrolyte. Next, after the sol electrolyte was uniformly applied to the cathode 11 and the anode 12 to impregnate the cathode 11 and the anode 12 with the sol electrolyte, they were left standing for 8 hours to volatilize diethyl carbonate, thereby the electrolyte layer 14 was formed.

Next, the cathode terminal 16 was attached to the cathode 11, and the anode terminal 17 was attached to the anode 12. After that, the cathode 11 having the electrolyte layer 14 thereon and the anode 12 having the electrolyte layer 14 thereon were laminated and spirally wound to form the battery element 10 with a capacity of 2.7 Wh.

Finally, the battery element 10 was interposed in the casing 20, and the sealing portion 20A of the casing 20 was thermally fusion bonded for 5 seconds at 200° C. to seal the battery element 10 in the casing 20, and then an edge portion of the casing 20 which was not thermally fusion bonded was cut. At that time, the sealing width W of the sealing portion 20A was changed in Examples 1-1 through 1-12 as shown in Table 1. Moreover, the resin piece 30 was inserted each between the cathode terminal 16 and the casing 20 and between the anode terminal 17 and the casing 20. The secondary batteries were obtained through the above-described steps.

The volume energy densities of the obtained secondary batteries of Examples 1-1 through 1-12 were determined. The results are shown in Table 1. Moreover, each battery was stored for 1 year under a temperature of 40° C. and a humidity of 55%, and the discharge capacities before and after the storage were determined, and as a capacity retention ratio, a ratio of the discharge capacity after the storage to the discharge capacity before the storage was calculated. Further, the amount of water entry into the battery was determined, and gas generation after the storage was checked. The results are also shown in Table 1. The amount of water entry into the battery was determined using the casing 20 containing 2 g of propylene carbonate instead of the battery element 10 by the Karl Fischer method.

Moreover, as Comparative Examples 1-1 through 1-5 relative to Examples 1-1 through 1-12, secondary batteries were formed as in the case of Examples 1-1 through 1-12, except that the material of the adhesive layer on the side closer to the battery element, and the water vapor transmission rate of the adhesive layer for a thickness of 25 μm at 40° C. and 90% RH, the thickness of the adhesive layer, and the sealing width were changed as shown in Table 1. As in the case of Examples 1-1 through 1-12, the volume energy densities of the secondary batteries of Comparative Examples 1-1 through 1-5 were determined. Further, the batteries were stored for one year under a temperature of 40° C. and a humidity of 55%, and then the amount of water and the capacity retention ratio after the storage were determined, and gas generation after the storage was checked. The results are also shown in Table 1.

It was obvious from Table 1 that when the water vapor transmission rate and the thickness of the adhesive layer 22 were reduced, the amount of water entry into the battery was declined, thereby the capacity retention ratio was apt to decline accordingly, and in Examples 1-1 through 1-12 in which the adhesive layer 22 with a water vapor transmission rate of 800 g/m$^2$·day or less and a thickness of 10 μm or less was included, even if the sealing width W was smaller than 10 mm, the amount of water entry into the battery was as small as less than 500 μg, and the capacity retention ratio could become 95% or over. Moreover, no gas generation was observed. On the other hand, in Comparative Examples 1-1 through 1-5 in which the adhesive layer 22 with a water vapor transmission rate of higher than 800 g/m$^2$·day or a thickness of larger than 10 μm, when the thickness of the adhesive layer 22 was 10 μm or less, the amount of water entry into the battery was as large as 500 μg or over, and the capacity retention ratio was as low as 70% or less, and gas generation was observed.

In other words, it was found out that in the case where the adhesive layer 22 had a water vapor transmission rate of 800 g/m$^2$·day or less and a thickness of 10 μm or less, even if the sealing width W was reduced, the entry of water could be prevented, and the volume energy density could be improved, and a decline in capacity and gas generation could be prevented.

Examples 2-1 Through 2-20

Secondary batteries described in the second embodiment were formed as Examples 2-1 through 2-20 and Comparative Examples 2-1 and 2-2. At that time, the secondary batteries were formed as in the case of Example 1-1, except that instead of the adhesive layer 22, the thermoplastic layer 42 made of maleic anhydride modified polypropylene or maleic anhydride modified polyethylene was formed, and the water vapor transmission rate of the thermoplastic layer 42 for a thickness of 25 μm at 40° C. and 90% RH, the thickness of the thermoplastic layer 42, and the sealing width W were changed as shown in Table 2. As in the case of Example 1-1, the volume energy densities of the secondary batteries of Examples 2-1 through 2-20 and Comparative Examples 2-1 and 2-2 were determined, and after the batteries were stored for one year under a temperature of 40° C. and a humidity of 55%, the amount of water and the capacity retention ratio after the storage were determined, and the gas generation after the storage was checked. The results are shown in Table 2.

TABLE 2

| | THERMOPLASTIC LAYER | | | | AMOUNT OF WATER | CAPACITY RETENTION | | |
| --- | --- | --- | --- | --- | --- | --- | --- | --- |
| | MATERIAL | WATER VAPOR TRANSMISSION RATE (g/m$^2$ · day) | THICKNESS (μm) | SEALING WIDTH (mm) | ENTRY AFTER STORAGE (μg) | RATIO AFTER STORAGE (%) | GAS GENERATION AFTER STORAGE | VOLUME ENERGY DENSITY (Wh/l) |
| EXAMPLE 2-1 | MODIFIED POLYPROPYLENE | 20 | 3 | 8 | 6 | 98 | NO | 201 |
| EXAMPLE 2-2 | MODIFIED POLYPROPYLENE | 20 | 3 | 5 | 10 | 98 | NO | 250 |
| EXAMPLE 2-3 | MODIFIED POLYPROPYLENE | 20 | 3 | 3 | 16 | 98 | NO | 294 |
| EXAMPLE 2-4 | MODIFIED POLYPROPYLENE | 20 | 3 | 2 | 24 | 98 | NO | 320 |
| EXAMPLE 2-5 | MODIFIED POLYPROPYLENE | 20 | 3 | 1 | 49 | 98 | NO | 350 |
| EXAMPLE 2-6 | MODIFIED POLYPROPYLENE | 40 | 3 | 1 | 97 | 97 | NO | 350 |
| EXAMPLE 2-7 | MODIFIED POLYPROPYLENE | 60 | 3 | 1 | 146 | 97 | NO | 350 |
| EXAMPLE 2-8 | MODIFIED POLYPROPYLENE | 20 | 10 | 1 | 162 | 96 | NO | 350 |
| EXAMPLE 2-9 | MODIFIED POLYPROPYLENE | 20 | 30 | 2 | 243 | 96 | NO | 320 |
| EXAMPLE 2-10 | MODIFIED POLYPROPYLENE | 20 | 50 | 2 | 404 | 96 | NO | 320 |
| EXAMPLE 2-11 | MODIFIED POLYETHYLENE | 30 | 3 | 8 | 9 | 98 | NO | 201 |

TABLE 2-continued

| | THERMOPLASTIC LAYER | | | AMOUNT OF WATER | CAPACITY RETENTION | | |
| --- | --- | --- | --- | --- | --- | --- | --- |
| MATERIAL | WATER VAPOR TRANSMISSION RATE ($g/m^2 \cdot day$) | THICKNESS ($\mu m$) | SEALING WIDTH (mm) | ENTRY AFTER STORAGE ($\mu g$) | RATIO AFTER STORAGE (%) | GAS GENERATION AFTER STORAGE | VOLUME ENERGY DENSITY (Wh/l) |
| EXAMPLE 2-12 MODIFIED POLYETHYLENE | 30 | 3 | 5 | 15 | 98 | NO | 250 |
| EXAMPLE 2-13 MODIFIED POLYETHYLENE | 30 | 3 | 3 | 24 | 98 | NO | 294 |
| EXAMPLE 2-14 MODIFIED POLYETHYLENE | 30 | 3 | 2 | 36 | 98 | NO | 320 |
| EXAMPLE 2-15 MODIFIED POLYETHYLENE | 30 | 3 | 1 | 73 | 97 | NO | 350 |
| EXAMPLE 2-16 MODIFIED POLYETHYLENE | 50 | 3 | 1 | 121 | 97 | NO | 350 |
| EXAMPLE 2-17 MODIFIED POLYETHYLENE | 70 | 3 | 1 | 170 | 96 | NO | 350 |
| EXAMPLE 2-18 MODIFIED POLYETHYLENE | 30 | 10 | 1 | 243 | 96 | NO | 350 |
| EXAMPLE 2-19 MODIFIED POLYETHYLENE | 30 | 30 | 3 | 243 | 96 | NO | 294 |
| EXAMPLE 2-20 MODIFIED POLYETHYLENE | 30 | 50 | 3 | 404 | 96 | NO | 294 |
| COMPARATIVE EXAMPLE 2-1 MODIFIED POLYPROPYLENE | 20 | 60 | 1 | 970 | 62 | YES | 350 |
| COMPARATIVE EXAMPLE 2-2 MODIFIED POLYETHYLENE | 30 | 60 | 1 | 1455 | 73 | YES | 350 |

It was obvious from Table 2 that in Examples 2-1 through 2-20 in which the thermoplastic layer 42 with a thickness of 50 μm or less was included, even if the sealing width W was smaller than 10 mm, the amount of water entry into the battery was as small as less than 500 μg, and the capacity retention ratio could become 95% or over. Moreover, no gas generation was observed. On the other hand, in Comparative Examples 2-1 and 2-2 in which the thermoplastic layer 42 with a thickness of larger than 50 μm was included, when the thermoplastic layer 42 had a thickness of 1 μm, the amount of water entry was as large as 500 μg or over, and the capacity retention ratio was as low as 75% or less. Further, gas generation was observed.

In other words, it was found out that when the thermoplastic layer 42 with a thickness of 50 μm or less was included, even if the sealing width W was reduced, the entry of water could be prevented, and the volume energy density could be improved, and a decline in capacity and gas generation could be prevented.

Examples 3-1 and 3-2

As Examples 3-1 and 3-2, secondary batteries were formed as in the case of Examples 2-9 and 2-19, except that the resin layer 23 was not formed. As in the case of Example 1-1, the volume energy densities of the secondary batteries of Examples 3-1 through 3-2 were determined, and after the batteries were stored for one year under a temperature of 40° C. and a humidity of 55%, the amount of water and the capacity retention ratio after the storage were determined, and gas generation after the storage was checked. The results are shown in Table 3.

TABLE 3

| | THERMOPLASTIC LAYER | | | AMOUNT OF WATER | CAPACITY RETENTION | | |
| --- | --- | --- | --- | --- | --- | --- | --- |
| MATERIAL | WATER VAPOR TRANSMISSION RATE ($g/m^2 \cdot day$) | THICKNESS ($\mu m$) | SEALING WIDTH (mm) | ENTRY AFTER STORAGE ($\mu g$) | RATIO AFTER STORAGE (%) | GAS GENERATION AFTER STORAGE | VOLUME ENERGY DENSITY (Wh/l) |
| EXAMPLE 3-1 MODIFIED POLYPROPYLENE | 20 | 30 | 2 | 243 | 96 | NO | 320 |
| EXAMPLE 3-2 MODIFIED POLYETHYLENE | 30 | 30 | 2 | 364 | 96 | NO | 320 |

It was obvious from Table 3 that in Examples 3-1 and 3-2 in which the resin layer 23 was not included, even if the sealing width W was 2 mm, the amount of water entry into the battery could become smaller than 500 μg, and the capacity retention ratio could become 95% or over. In other words, it was found out that in the case where the battery did not include the resin layer 23, and included the thermoplastic layer 42 with a thickness of 50 μm or less, even if the sealing width W was reduced, the entry of water could be prevented, and the volume energy density could be improved, and a decline in capacity and gas generation could be prevented.

The present invention is described referring to the embodiments and the examples, but the invention is not limited to the embodiments and the examples, and is variously modified. For example, in the above embodiments and the above examples, the casing 20 is formed through folding one film, but two casings may be bonded together to form the casing 20.

Moreover, in the above embodiments and the above examples, the case where lithium is used as an electrode reactive species is described; however, the invention can be applied to the case where any other alkali metal such as sodium (Na) or potassium (K), alkaline-earth metal such as magnesium or calcium (Ca), any other light metal such as aluminum, lithium, or an alloy thereof is used, thereby the same effects can be obtained. In this case, a battery can be formed as in the case of the embodiments, except that the cathode active material, the anode active material and the electrolyte salt are selected depending upon the light metal.

Moreover, in the above embodiments and the above examples, the case where the invention is applied to the secondary battery is described; however, the invention can be applied to primary batteries.

As described above, the battery according to the invention comprises the adhesive layer having a water vapor transmission rate of 800 g/m$^2$·day for a thickness of 25 μm at 40° C. and 90% RH, and a thickness of 10 μm or less, or the thermoplastic layer with a thickness of 50 μm or less on a battery element side of the metal layer, so even if the sealing width is, for example, 5 mm or less, more specifically smaller than 3 mm, the entry of water into the battery can be prevented. Therefore, the energy density per unit volume can be improved, and decomposition of water can be prevented, thereby lithium-ion consumption or generation of a decomposed gas can be prevented.

Obviously many modifications and variations of the present invention are possible in the light of the above teachings. It is therefore to be understood that within the scope of the appended claims the invention may be practiced otherwise than as specifically described.

What is claimed is:

1. A battery, comprising:
    a battery element including a cathode, an anode, and an electrolyte; and
    a film-shaped case accommodating said battery element including
        a) a sealing portion disposed in a edge portion of the case and having a width of 1 mm to 5 mm,
        b) a metal layer,
        c) a first resin layer disposed on the side of the metal layer closest to the battery element with a thermoplastic layer in between the metal layer and the first resin layer, and
        d) a second resin layer disposed on the side of the metal layer farthest from the battery element with an adhesive layer in between the metal layer and the second resin layer;
    wherein,
        the thermoplastic layer has a thickness of 50 μm or less,
        the resin piece is disposed between the casing and the cathode terminal of the battery element and between the casing and the anode terminal of the battery element to prevent the entry of air, and
        the adhesive layer has a thickness of 20 μm or less and the adhesive of the adhesive layer includes at least two selected from a group of acrylic adhesives and polyurethane adhesives.

2. A battery according to claim 1, wherein the thermoplastic layer includes a modified polyolefin resin.

3. A battery according to claim 2, wherein the thermoplastic layer includes at least one kind selected from the group consisting of modified polypropylene having a carbonyl group and modified polyethylene having a carbonyl group.

4. A battery according to claim 1, wherein the electrolyte includes a gel electrolyte or a solid electrolyte.

5. A battery according to claim 1, wherein the anode includes an anode material capable of inserting and extracting lithium (Li).

6. A battery according to claim 5, wherein the anode includes a carbon material.

7. A battery according to claim 1, wherein the cathode includes a cathode material capable of inserting and extracting lithium (Li).

8. A battery according to claim 7, wherein the cathode includes a complex oxide of lithium and a transition metal.

9. A battery according to claim 1, wherein the scaling portion disposed in the edge portion of the case ha a width of 1 mm to less than 3 mm.

* * * * *